United States Patent
Sato et al.

(10) Patent No.: US 9,922,766 B2
(45) Date of Patent: Mar. 20, 2018

(54) CERAMIC ELECTRONIC COMPONENT

(71) Applicant: TDK Corporation, Minato-ku, Tokyo (JP)

(72) Inventors: Masayuki Sato, Tokyo (JP); Yosuke Konno, Nikaho (JP); Shunichi Yuri, Tokyo (JP); Takashi Morita, Tokyo (JP); Tsutomu Odashima, Tokyo (JP); Yasuhiro Ito, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 15/392,493

(22) Filed: Dec. 28, 2016

(65) Prior Publication Data

US 2017/0186536 A1    Jun. 29, 2017

(30) Foreign Application Priority Data

Dec. 28, 2015    (JP) ................. 2015-257400

(51) Int. Cl.
*H01G 4/12*    (2006.01)
*C04B 35/468*    (2006.01)
*H01G 4/30*    (2006.01)

(52) U.S. Cl.
CPC ......... *H01G 4/1209* (2013.01); *C04B 35/468* (2013.01); *H01G 4/1227* (2013.01); *H01G 4/30* (2013.01)

(58) Field of Classification Search
CPC .................... C04B 35/4682; H01G 4/1227
See application file for complete search history.

(56) References Cited

U.S. PATENT DOCUMENTS

| | | | |
|---|---|---|---|
| 9,666,372 B2 * | 5/2017 | Kaneko | H01G 4/30 |
| 2012/0075768 A1 * | 3/2012 | Takeda | H01G 4/1227 361/301.4 |
| 2016/0268045 A1 * | 9/2016 | Kaneko | H01G 4/30 |

FOREIGN PATENT DOCUMENTS

JP    2006-290675 A    10/2006

* cited by examiner

*Primary Examiner* — Karl E Group
(74) *Attorney, Agent, or Firm* — Arent Fox LLP

(57) ABSTRACT

A ceramic electronic component includes a dielectric layer and an electrode layer. The dielectric layer contains barium titanate and yttrium. The dielectric layer contains dielectric particles and Y—Ti segregation particles. An area ratio occupied by the Y—Ti segregation particles is 1.3% or less on a cross section of the dielectric layer.

4 Claims, 1 Drawing Sheet

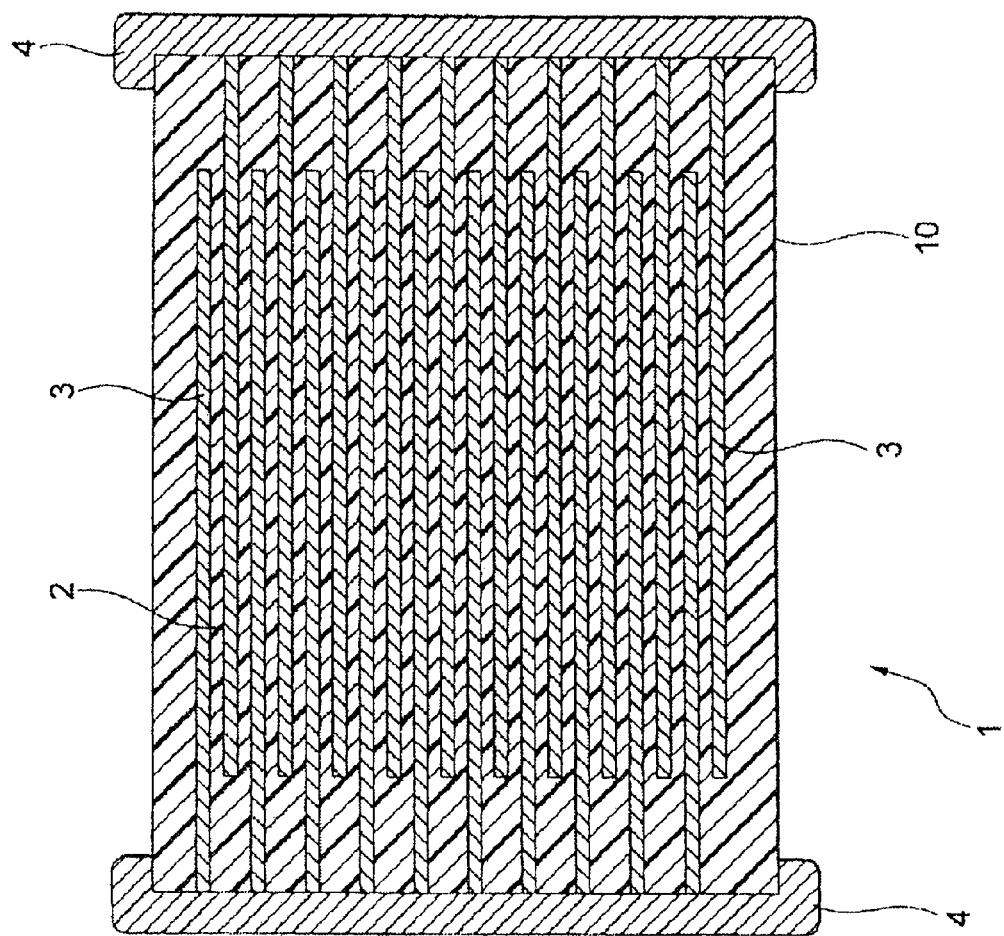

CERAMIC ELECTRONIC COMPONENT

CROSS-REFERENCE TO RELATED APPLICATION

This application claims the priority to Japanese Patent Application No. 2015-257400, filed Dec. 28, 2015.

BACKGROUND OF THE INVENTION

1. Field of the Invention

The present invention relates to a ceramic electronic component.

2. Description of the Related Art

Ceramic electronic components are widely utilized as miniature, high performance, and high reliability electronic components, and a large number thereof are used in electrical apparatuses and electronic apparatuses. In recent years, requirements for miniaturization, higher performance, and higher reliability of ceramic electronic components have been more and more severe due to the miniaturization and increasingly high performance of electrical apparatuses and electronic apparatuses.

In response to such requirements, Patent Document 1 discloses a multilayer ceramic capacitor attempting to improve its reliability such as dielectric breakdown voltage by adopting a specific relationship between a BET value of a raw material powder of barium titanate and a BET value of a raw material powder of a dielectric ceramic composition. However, a further improvement in high-temperature load lifetime is now required.

Patent Document 1: JP 2006-290675 A

SUMMARY OF THE INVENTION

The present invention has been made in view of such circumstances. It is an object of the invention to provide a ceramic electronic component that achieves improvement in high-temperature load lifetime and has high reliability.

The present inventors have studied to overcome the above problems, and have found out that dielectric layers of a ceramic electronic component should contain Y—Ti segregation particles in addition to dielectric particles. The present inventors have found out that high-temperature load lifetime can be improved by setting an amount of the Y—Ti segregation particles within a specific range and by further containing a compound mentioned below within a range mentioned below, and that reliability can be consequently improved. The present invention has been accordingly accomplished.

The ceramic electronic component according to the present invention is specifically a ceramic electronic component including a dielectric layer and an electrode layer, wherein the dielectric layer contains barium titanate and yttrium, the dielectric layer contains dielectric particles and Y—Ti segregation particles, and an area ratio occupied by the Y—Ti segregation particles is 1.3% or less on a cross section of the dielectric layer.

Preferably, the dielectric layer contains magnesium, chromium, vanadium, calcium, and silicon, and an amount of the yttrium is 1.0 to 1.5 mol parts in terms of $Y_2O_3$, an amount of the magnesium is 1.8 to 2.5 mol parts in terms of MgO, an amount of the chromium is 0.2 to 0.7 mol parts in terms of $Cr_2O_3$, an amount of the vanadium is 0.05 to 0.2 mol parts in terms of $V_2O_5$, an amount of the calcium is 0.5 to 2.0 mol parts in terms of CaO, and an amount of the silicon is 1.65 to 3.0 mol parts in terms of $SiO_2$, provided that an amount of the barium titanate is 100 mol parts in terms of $BaTiO_3$.

Preferably, d50 of the dielectric particles is 0.47 μm or less.

Preferably, a value of an amount of the yttrium in terms of $Y_2O_3$ in the dielectric layer divided by an amount of the silicon in terms of $SiO_2$ in the dielectric layer is 0.79 or less.

BRIEF DESCRIPTION OF THE DRAWINGS

The FIGURE is a cross-sectional view of a multilayer ceramic capacitor according to an embodiment of the present invention.

DESCRIPTION OF THE PREFERRED EMBODIMENTS

The present invention will be described below based on an embodiment shown in the drawing.

Multilayer Ceramic Capacitor 1

As shown in the FIGURE, a multilayer ceramic capacitor 1 according to an embodiment of the present invention includes a capacitor element body 10 having a configuration in which dielectric layers 2 and internal electrode layers 3 are alternately laminated. The internal electrode layers 3 are laminated such that each of their end surfaces is alternately exposed on surfaces of the opposing two ends of the capacitor element body 10. The pair of external electrodes 4 is formed on both ends of the capacitor element body 10, and is connected to the exposed end surfaces of the alternately disposed internal electrode layers 3 to configure a capacitor circuit.

The capacitor element body 10 has any shape, but normally has a rectangular parallelepiped shape as shown in the FIGURE. The capacitor element body 10 has any size appropriately determined according to application.

Dielectric Layer 2

The dielectric layer 2 is composed of a dielectric ceramic composition that contains barium titanate, yttrium, magnesium, chromium, vanadium, calcium, and silicon. The dielectric layer 2 necessarily contains at least barium titanate and yttrium.

The barium titanate used in the present embodiment is expressed by a composition formula of $Ba_mTiO_{2+m}$. "m" and a mole ratio of Ba and Ti are not limited, but barium titanate in which "m" satisfies 0.995≤m≤1.010, and the mole ratio of Ba and Ti satisfies 0.995≤Ba/Ti≤1.010 can be favorably used. Hereinafter, the composition formula of barium titanate will be simply described as $BaTiO_3$.

Yttrium is contained preferably at 1.0 to 1.5 mol parts and more preferably at 1.3 to 1.5 mol parts in terms of $Y_2O_3$ with respect to 100 mol parts of barium titanate. The larger an amount of yttrium is, the larger a Y—Ti segregation ratio mentioned below tends to be. It becomes easy to control the Y—Ti segregation ratio to less than 1.3% by setting yttrium within the above range. The more yttrium is contained, the better electrostatic capacity temperature characteristics tend to be. In addition to yttrium, another rare earth element "R" may be added. An addition amount of a compound of another rare earth element "R" is not limited, and may be 1.5 mol parts or less in terms of $R_2O_3$, for example.

Magnesium is contained preferably at 1.8 to 2.5 mol parts and more preferably at 1.8 to 2.2 mol parts in terms of MgO with respect to 100 mol parts of barium titanate. The larger an amount of magnesium is, the smaller the Y—Ti segregation ratio mentioned below tends to be. Setting an amount of magnesium to 2.5 mol parts or less may prevent an excessive segregation of Mg, and may prevent deterioration of high-temperature load lifetime. It becomes easy to control the Y—Ti segregation ratio mentioned below to 1.3% or less by setting an amount of the magnesium to 1.8 mol parts or more. The less magnesium is contained, the better relative permittivity tends to be.

Chromium is contained preferably at 0.2 to 0.7 mol parts and more preferably at 0.2 to 0.4 mol parts in terms of $Cr_2O_3$ with respect to 100 mol parts of barium titanate. The larger an amount of chromium is, the smaller the Y—Ti segregation ratio mentioned below tends to be. Setting an amount of chromium to 0.7 mol parts or less may prevent an excessive segregation of Cr, and may prevent deterioration of high-temperature load lifetime. It becomes easy to control the Y—Ti segregation ratio mentioned below to 1.3% or less by setting an amount of chromium to 0.2 mol parts or more. The less chromium is contained, the better relative permittivity and electrostatic capacity temperature characteristics tend to be. Incidentally, manganese may be contained instead of chromium.

Vanadium is contained preferably at 0.05 to 0.2 mol parts and more preferably at 0.05 to 0.10 mol parts in terms of $V_2O_5$ with respect to 100 mol parts of barium titanate. The larger an amount of vanadium is, the smaller the Y—Ti segregation ratio mentioned below tends to be. Setting an amount of vanadium to 0.2 mol parts or less may prevent an excessive segregation of V, and may prevent deterioration of high-temperature load lifetime. It becomes easy to control the Y—Ti segregation ratio mentioned below to 1.3% or less by setting an amount of vanadium to 0.05 mol parts or more. The less vanadium is contained, the better relative permittivity tends to be. The more vanadium is contained, the better electrostatic capacity temperature characteristics tend to be.

Calcium is contained preferably at 0.5 to 2.0 mol parts and more preferably at 0.7 to 1.5 mol parts in terms of CaO with respect to 100 mol parts of barium titanate. Setting an amount of calcium to 2.0 mol parts or less may prevent an excessive segregation of Ca, and may prevent deterioration of high-temperature load lifetime. It becomes easy to control the Y—Ti segregation ratio mentioned below to 1.3% or less by setting an amount of calcium to 0.5 mol parts or more. The less calcium is contained, the better electrostatic capacity temperature characteristics tend to be.

Silicon is contained preferably at 1.65 to 3.0 mol parts and more preferably at 1.7 to 2.5 mol parts in terms of $SiO_2$ with respect to 100 mol parts of barium titanate. Setting an amount of silicon to 3.0 mol parts or less may prevent an excessive segregation of Si, and may prevent deterioration of high-temperature load lifetime. It becomes easy to control the Y—Ti segregation ratio mentioned below to 1.3% or less by setting an amount of silicon to 1.65 mol parts or more. The less silicon is contained, the better electrostatic capacity temperature characteristics tend to be. The more silicon is contained, the better relative permittivity tends to be.

Segregation Region 20

In the present embodiment, dielectric particles and Y—Ti segregation particles containing Y and Ti respectively at predetermined concentrations or more mentioned below are present in the dielectric layer 2. The dielectric particles are mainly composed of barium titanate. When a region occupied by the Y—Ti segregation particles (hereinafter, may be described as a Y—Ti segregation region) is present at 1.3% or less by area ratio to a cross section of the dielectric layer 2, high-temperature load lifetime of a capacitor can be improved, and reliability thereof can be consequently enhanced. In the present embodiment, the Y—Ti segregation region should be present, and there is no lower limit for an area ratio of the Y—Ti segregation region, but it is normally 0.1% or more.

The mechanism of causing the Y—Ti segregation particles is unclear, but it is conceivable that a valence of Ti contained in barium titanate varies by firing in a reducing atmosphere, Ti whose valence has varied is combined with Y instead of Ba, and thus the Y—Ti segregation particles composed of composite oxides containing Y and Ti are generated.

A phase other than the dielectric particles and the Y—Ti segregation particles may be present in the dielectric layer 2. The phase other than the dielectric particles and the Y—Ti segregation particles may have any composition, and may contain Ba, Ti, Y, Mg, Cr, V, Si, and the like. A main component of the dielectric particles is $BaTiO_3$, and Y element is dissolved in solid state therein.

In the region occupied by the Y—Ti segregation particles, compounds of yttrium are present at a higher concentration than the region occupied by the dielectric particles and the other region, and compounds of titanium are further present. Y of the Y—Ti segregation particles is present at a place where Ba is deficient, and thus a concentration of Ba contained in the Y—Ti segregation particles is lower than a concentration of Ba contained the dielectric particles. Ba, Mg, Cr, V, Si, and the like may be contained in the Y—Ti segregation particles, but an oxide of these elements is preferably not segregated. High-temperature load lifetime tends to be favorable when compounds of these elements are not segregated. Incidentally, since $BaTiO_3$ is a main component of the dielectric particles, there is no "segregation region where only $BaTiO_3$ is segregated".

In the present embodiment, an area ratio of the Y—Ti segregation region is determined as below.

First, a cross section of the dielectric layer 2 is observed by a scanning transmission electron microscope (STEM), and an element mapping image of Y element with respect to a visual field of (2.0 to 5.0) μm×(2.0 to 5.0) μm is obtained using an auxiliary energy dispersion type X-ray spectrometer. Incidentally, the size of the visual field may be appropriately changed within the above range.

Then, the mapping image of Y element obtained as above undergoes image processing to be divided into a region whose concentration of Y element within the visual field is twice or larger than an average concentration thereof and a region whose concentration of Y element within the visual field is less than twice an average concentration thereof.

Next, a mapping image of Ti element is prepared in the same manner as the mapping image of Y element. Then, the mapping image of Ti element undergoes image processing to be divided into a region whose concentration of Ti element within the visual field is 0.7 to 1.1 times larger than an average concentration thereof and the other region.

Next, a mapping image of Ba element is prepared in the same manner as the mapping image of Y element. Then, the mapping image of Ba element undergoes image processing to be divided into a region whose concentration of Ba element within the visual field is 0.5 times or smaller than an average concentration thereof and a region whose concentration of Ba element within the visual field is 0.5 times larger than an average concentration thereof.

Next, the image obtained by image processing of the mapping image of Y element, the image obtained by image processing of the mapping image of Ti element, and the image obtained by image processing of the mapping image of Ba element are overlapped, and a Y—Ti segregation region is defined as a region where a concentration of Y element is twice or larger than an average concentration of Y element, a concentration of Ti is 0.7 to 1.1 times larger than an average concentration of Ti element, and a concentration of Ba element is 0.5 times or smaller than an average concentration of Ba element. In the dielectric ceramic composition according to the present embodiment, an area ratio of the Y—Ti segregation region with respect to the entire dielectric ceramic composition is 1.3% or less.

Incidentally, an area of one Y—Ti segregation region is defined to be 0.01 $\mu m^2$ or more. When an area of a region is less than 0.01 $\mu m^2$, this region is not regarded as the Y—Ti segregation region even if, in this region, a concentration of Y element is twice or larger than an average concentration of Y element, a concentration of Ti is 0.7 to 1.1 times larger than an average concentration of Ti element, and a concentration of Ba element is 0.5 times or smaller than an average concentration of Ba element. Incidentally, an area of one Y—Ti segregation region is mostly 0.04 $\mu m^2$ or less.

High-temperature load lifetime can be improved by controlling an area ratio of the Y—Ti segregation region to 1.3% or less. High-temperature load lifetime deteriorates when there is no Y—Ti segregation region or when an area ratio of the Y—Ti segregation region is too large.

Furthermore, a grain diameter of the dielectric particles is not limited, but d50 is preferably 0.47 $\mu m$ or less. The larger a grain diameter of the dielectric particles is, the larger the Y—Ti segregation ratio tends to be. It becomes easy to control the Y—Ti segregation ratio to 1.3% or less by having d50 of 0.47 $\mu m$ or less. The larger a grain diameter of the dielectric particles is, the more relative permittivity tends to improve. The smaller a grain diameter of the dielectric particles is, the more high-temperature load lifetime and electrostatic capacity temperature characteristics tend to improve. Incidentally, d50 refers to a diameter of grain size at which an integrated value is 50%.

Furthermore, in the present embodiment, a mole ratio ($Y_2O_3/SiO_2$) between an amount of yttrium in terms of $Y_2O_3$ and an amount of silicon in terms of $SiO_2$ is preferably 0.79 or less. The larger $Y_2O_3/SiO_2$ is, the larger the Y—Ti segregation ratio tends to be. Then, it becomes easy to control the Y—Ti segregation ratio to 1.3% or less by having $Y_2O_3/SiO_2$ of 0.79 or less. There is no lower limit for $Y_2O_3/SiO_2$. The larger $Y_2O_3/SiO_2$ is, the more electrostatic capacity temperature characteristics tend to improve.

A thickness of the dielectric layers 2 is not limited, but is preferably 2 to 10 $\mu m$ per one layer.

The number of lamination of the dielectric layers 2 is not limited, but is preferably about 300 to 400 layers. The upper limit of lamination is not limited, but is about 2000 layers, for example.

Internal Electrode Layer 3

A conductive material contained in the internal electrode layer 3 is not limited, but a comparatively low-cost base metal can be employed, as a constituent material of the dielectric layer 2 is reduction resistant. Ni or an Ni alloy is preferable as the base metal employed as the conductive material. An alloy of Ni and one kind or more selected from Mn, Cr, Co, and Al is preferable as the Ni alloy, and an Ni amount in the alloy is preferably 95 wt % or more. Incidentally, about 0.1 wt % or less of various kinds of trace components, such as P, may be contained in the Ni or Ni alloy. A thickness of the internal electrode layer 3 should be appropriately determined according to application or so, but is preferably about 1 to 1.2 $\mu m$.

External Electrode 4

A conductive material contained in the external electrode 4 is not limited, but low-cost Ni, Cu, or an alloy of these can be employed in the present invention. A thickness of the external electrode 4 should be appropriately determined according to application or so, but is normally preferably about 10 to 50 $\mu m$.

Method of Manufacturing Multilayer Ceramic Capacitor 1

The multilayer ceramic capacitor 1 of the present embodiment is manufactured similarly to conventional multilayer ceramic capacitors by preparing a green chip with an ordinary printing method or sheet method using a paste, firing this, and then firing this after external electrodes are printed or transferred thereon. This manufacturing method will be described specifically below.

First, a dielectric raw material (mixed raw material powder) contained in a dielectric layer-dedicated paste is prepared, and this is made into a coating to prepare the dielectric layer-dedicated paste.

First, a raw material of barium titanate and a raw material of yttrium are prepared as dielectric raw materials. As these raw materials, oxides of the above-described compositions or mixtures and composite oxides thereof can be employed, but a mixture of various compounds appropriately selected from, for example, carbonates, oxalates, nitrates, hydroxides, organic metallic compounds and the like, which become the above-described oxides or composite oxides after firing, can be also employed.

It is possible to employ a barium titanate raw material manufactured by a variety of methods, such as liquid phase methods (e.g., oxalate method, hydrothermal method, alkoxide method, sol-gel method etc.), in addition to a so-called solid phase method.

A BET specific surface area value of the barium titanate raw material is preferably 2.0 to 5.0 $m^2/g$, and is more preferably 2.5 to 3.5 $m^2/g$. With the material of barium titanate having such a BET specific surface area value and the material of yttrium, it becomes possible to deposit Y that has not contributed to diffusion to the dielectric particles and Ti in the dielectric particles in a desired state. As a result, it becomes easy to control an area ratio of the Y—Ti segregation region within the range of the present invention.

The surface of the raw material powder of barium titanate may be coated with at least the raw material powder of yttrium. This coating method is not limited, and a well-known method is employed. For example, the coating may be performed by turning the raw material powder of yttrium into a solution and thermally processing this solution. With such a coated powder, it becomes possible to efficiently form the Y—Ti segregation particles. The surface of the raw material powder of barium titanate may be coated with a raw material powder of another component.

The amount of each compound in the dielectric raw material should be determined such that the composition of the above-described dielectric ceramic composition is obtained after firing. Incidentally, there is normally no change in composition of the dielectric ceramic composite between before and after firing.

Apart from a barium titanate powder, a barium compound powder (e.g., a barium oxide powder, or a powder to be barium oxide by firing) may be added to the above-described dielectric raw material. There is no limit for an addition amount of the barium compound powder, and the barium compound powder may not be added. When adding the barium compound powder, for example, 0.20 to 1.50 mol parts in terms of barium oxide with respect to 100 mol parts of barium titanate may be added. Relative permittivity tends to be good by adding the barium compound. The larger an amount of the barium compound is, the larger the Y—Ti segregation ratio tends to be. The larger an amount of the barium compound is, the better electrostatic capacity temperature characteristics tend to be.

In the present embodiment, when using oxides of each element as raw material powders of the barium compound, calcium, and silicon, these powders may be prepared respectively in the form of BaO powder, CaO powder, and $SiO_2$ powder, or may be prepared in the form of a composite oxide (Ba, Ca) $SiO_3$ powder (BCG powder). Incidentally, there is no limit for the composition of (Ba, Ca) $SiO_3$, that is, a content ratio of Ba, Ca, and Si.

Now, d50 of the dielectric raw material is not limited, but is preferably 0.45 μm or less. The larger d50 of the dielectric raw material is, the larger the Y—Ti segregation region tends to be. When d50 of the dielectric raw material is 0.45 μm or less, it becomes easy to control d50 of the dielectric particles after firing to 0.47 μm or less and to control the Y—Ti segregation region to 1.3% or less. The larger d50 of the dielectric raw material is, the better relative permittivity tends to be. The smaller d50 of the dielectric raw material is, the better high-temperature load lifetime and electrostatic capacity temperature characteristics tend to be.

The dielectric layer-dedicated paste may be an organic-based coating made by kneading the dielectric raw material and an organic vehicle, or may be a water-based coating.

The organic vehicle is made by dissolving a binder in an organic solvent. The binder used for the organic vehicle is not limited, and should be appropriately selected from various ordinary binders such as ethyl cellulose and polyvinyl butyral. The organic solvent used is not limited either, and should be appropriately selected from various organic solvents, such as terpineol, butyl carbitol, aceton, and toluene, according to a method utilized, such as a printing method and sheet method.

When the dielectric layer-dedicated paste is configured as a water-based coating, the dielectric raw material and a water-based vehicle made by dissolving the likes of a water-soluble binder or dispersing agent in water are kneaded. The water-soluble binder employed in the water-based vehicle is not limited, and for example, polyvinyl alcohol, cellulose, a water-soluble acrylic resin and the like should be employed.

An internal electrode layer-dedicated paste is prepared by kneading the above-described organic vehicle and either a conductive material composed of the above-described various kinds of conductive metals and alloys or various kinds of oxides, organic metal compounds, resinates, and the like to be the above-described conductive material after firing. Further, a common material may be contained in the internal electrode layer-dedicated paste. The common material is not limited, but preferably has a composition similar to the main component.

An external electrode-dedicated paste is prepared similarly to the above-described internal electrode layer-dedicated paste.

The amount of the organic vehicle in each of the above-described pastes is not limited, and an ordinary amount (e.g., binder: about 1 to 5 wt %, solvent: about 10 to 50 wt %) is selected. If necessary, additives selected from various dispersing agents, plasticizing agents, dielectrics, insulators, and so on may be contained in each paste. The total amount of these additives is preferably 10 wt % or less.

When a printing method is employed, the dielectric layer-dedicated paste and the internal electrode layer-dedicated paste are printed on a substrate of PET or the like, laminated, and cut in a predetermined shape, after which the cut portions are peeled off from the substrate to obtain green chips.

When a sheet method is employed, a green sheet is formed using the dielectric layer-dedicated paste, the internal electrode layer-dedicated paste is printed and an internal electrode pattern is formed on this green sheet, after which these are laminated to obtain a green chip.

Debinding treatment is performed on the green chip before firing. As debinding conditions, a temperature increase rate is preferably 5 to 300° C./hour, a holding temperature is preferably 180 to 400° C., and a temperature holding time is preferably 0.5 to 24 hours. A debinding atmosphere is air or a reducing atmosphere.

In firing of the green chip, a temperature increase rate is preferably 200 to 600° C./hour, and is more preferably 200 to 500° C./hour. With such a temperature increase rate, it becomes possible to favorably control existence states of the Y segregation region and the Ti present region. As a result, it becomes easy to control an area ratio of the Y—Ti segregation region to 1.3% or less.

A holding temperature during firing is preferably 1200 to 1350° C. and is more preferably 1220 to 1300° C., and its holding time is preferably 0.5 to 8 hours and is more preferably 2 to 3 hours. When a holding temperature is 1200° C. or higher, the dielectric ceramic composite becomes easy to be sufficiently densified. When a holding temperature is 1350° C. or lower, it becomes easy to prevent a break of an electrode due to abnormal sintering of the internal electrode layer, deterioration of capacity temperature characteristics due to diffusion of an internal electrode layer constituent material, reduction of the dielectric ceramic composition, and the like.

A firing atmosphere is preferably a reducing atmosphere, and a humidified mixed gas of $N_2$ and $H_2$ can be employed as an atmospheric gas, for example.

An oxygen partial pressure during firing should be appropriately determined according to a kind of conductive material in the internal electrode layer-dedicated paste, but when a base metal of the likes of Ni or an Ni alloy is employed as the conductive material, an oxygen partial pressure in the firing atmosphere is preferably $10^{-14}$ to $10^{-10}$ MPa. When an oxygen partial pressure is $10^{-14}$ MPa or higher, it becomes easy to prevent the conductive material of the internal electrode layer from causing abnormal sintering, and it becomes easy to prevent the internal electrode layer from suffering a break. When an oxygen partial pressure is $10^{-10}$ MPa or lower, it becomes easy to prevent oxidation of the internal electrode layer. A temperature decrease rate is preferably 50 to 500° C./hour.

After undergoing firing in a reducing atmosphere, the capacitor element body preferably undergoes annealing. The annealing is a treatment for reoxidizing the dielectric layer, which can significantly increase high-temperature load lifetime and thus improve reliability.

An oxygen partial pressure in an annealing atmosphere is preferably $10^{-9}$ to $10^{-5}$ MPa. When an oxygen partial pressure is $10^{-9}$ MPa or higher, it becomes easy to efficiently perform reoxidation of the dielectric layer. When an oxygen partial pressure is $10^{-5}$ MPa or lower, it becomes easy to prevent oxidation of the internal electrode layer.

A holding temperature during annealing is preferably 950 to 1150° C. When a holding temperature is 950° C. or higher, the dielectric layer becomes easy to be sufficiently oxidized, and insulation resistance (IR) and IR lifetime become easy to improve. On the other hand, when a holding temperature is 1150° C. or lower, it becomes easy to prevent oxidation of the internal electrode layer and a reaction between the internal electrode layer and a dielectric base. As a result, it becomes easy to improve electrostatic capacity, electrostatic capacity temperature characteristics, IR, and IR lifetime. Incidentally, the annealing may consist of only a temperature increase process and a temperature decrease process. That is, temperature holding time may be zero. In this case, holding temperature is identical to maximum temperature.

Regarding annealing conditions other than these, a temperature holding time is preferably 0 to 20 hours and is more preferably 2 to 4 hours, and a temperature decrease rate is preferably set to 50 to 500° C./hour and is more preferably set to 100 to 300° C./hour. For example, humidified $N_2$ gas or so is preferably employed as an atmospheric gas of the annealing.

For example, a wetter or so is used for humidifying $N_2$ gas or mixed gas or so in the above-described debinding treatment, firing, and annealing. In this case, a water temperature is preferably about 5 to 75° C.

The debinding treatment, firing, and annealing may be performed in succession, or may be performed independently.

The capacitor element body obtained as described above undergoes end surface polishing by barrel polishing, sand blasting, or the like, for example, is coated with the external electrode-dedicated paste and then fired to form the external electrode 4. If necessary, a covering layer is formed on the surface of the external electrode 4 by plating or so.

The multilayer ceramic capacitor of the present embodiment thus manufactured is mounted, for example, on a printed board by solder or so, and is used in various kinds of electronic apparatuses, and so on.

The embodiments of the present invention have been described. The present invention is not limited to the above-mentioned embodiments, and may be variously modified within a scope not deviating from the purpose of the present invention.

In the above-mentioned embodiments, a multilayer ceramic capacitor was exemplified as the ceramic electronic component according to the present invention, but the ceramic electronic component according to the present invention is not limited to a multilayer ceramic capacitor, and may be any ceramic electronic component having dielectric layers and electrode layers. For example, a single-plate ceramic capacitor, a piezoelectric actuator, a ferroelectric memory, and so on, may be cited.

EXAMPLES

The present invention will be described below based on more detailed examples, but is not limited thereto.

Example 1

First, a barium titanate powder and a $Y_2O_3$ powder as a raw material of yttrium were respectively prepared. A barium titanate expressed by a composition formula of $Ba_mTiO_2+m$ was employed, where "m" satisfies $0.995 \leq m \leq 1.010$, and the mole ratio of Ba and Ti satisfies $0.995 \leq Ba/Ti \leq 1.010$. Hereafter, the composition formula of barium titanate will be described simply as $BaTiO_3$. A $MgCO_3$ powder as a magnesium raw material, a $Cr_2O_3$ powder as a chromium raw material, and a $V_2O_5$ powder as a vanadium raw material were prepared. Furthermore, a BaO powder as a raw material of the barium compound, a CaO powder as a calcium raw material, and a $SiO_2$ powder as a silicon raw material were prepared.

Next, each of the prepared raw material powders was wet-blended and pulverized for 10 hours by a ball mill, and then dried to obtain a mixed raw material powder. A grain diameter of the raw material powder was assumed to be a material grain diameter, and d50 of the material grain diameter was configured to be 0.40 µm.

Next, 100 weight parts of the obtained mixed raw material powder, 10 weight parts of a polyvinyl butyral resin, 5 weight parts of dioctyl phthalate (DOP) as a plasticizing agent, and 100 weight parts of an alcohol as a solvent were blended by a ball mill to form a paste, thereby obtaining a dielectric layer-dedicated paste.

Apart from the above, 44.6 weight parts of Ni grains, 52 weight parts of terpineol, 3 weight parts of ethyl cellulose, and 0.4 weight parts of benzotriazole were kneaded by a triple roll milling machine to form a slurry, whereby an internal electrode layer-dedicated paste was prepared.

Then, a green sheet was formed on a PET film to have a thickness of 4.5 µm after being dried using the dielectric layer-dedicated paste produced as above. Next, an electrode layer was printed with a predetermined pattern on this green sheet using the internal electrode layer-dedicated paste, and then the sheet was peeled from the PET film, whereby a green sheet having the electrode layer was prepared. Next, a plurality of the green sheets having electrode layers was laminated and pressure-bonded to be made into a green laminated body, and this green laminated body was cut into a predetermined size, whereby a green chip was obtained.

Next, the obtained green chip underwent debinding treatment, firing, and annealing under the following conditions to obtain a multilayer ceramic fired body.

As debinding treatment conditions, temperature increase rate was 25° C./hour, holding temperature was 260° C., temperature holding time was 8 hours, and atmosphere was in the air.

As firing conditions, temperature increase rate was 200° C./hour, holding temperature was 1200 to 1350° C., and holding time was 1 hour. Temperature decrease rate was 200° C./hour. Incidentally, atmospheric gas was a humidified $N_2+H_2$ mixed gas, and oxygen partial pressure was configured to be $10^{-12}$ MPa.

As annealing conditions, temperature increase rate was 200° C./hour, holding temperature was 1000° C., temperature holding time was 2 hours, temperature decrease rate was 200° C./hour, and atmospheric gas was humidified $N_2$ gas (oxygen partial pressure: $10^{-7}$ MPa).

Incidentally, a wetter was used to humidify the atmospheric gas during firing and annealing.

Next, an end surface of the obtained multilayer ceramic fired body was polished by sand blasting, then Cu was applied as an external electrode, and a sample of the multilayer ceramic capacitor shown in the FIGURE was obtained. Size of the obtained capacitor sample was 3.2 mm×1.6 mm×0.6 mm. Thickness of the dielectric layer was 3.6 µm. Thickness of the internal electrode layer was 1.0 µm. The number of the dielectric layers sandwiched by the dielectric layers was four.

The obtained capacitor sample was respectively subjected to observation of d50 of the dielectric particles after firing and the segregation region and to measurement of high-temperature load lifetime by the following method.

d50 of Dielectric Particles after Firing

Samples whose chip side surfaces had been subjected to mirror polishing were observed by FE-SEM to obtain an image magnified by 30000 times, and d50 of the dielectric particles after firing was measured from an equivalent circle diameter of particles obtained from the image. Incidentally, the number of the sample particles was 500 to 2000.

Observation of Segregation Region

STEM observation was performed on the cut surface of the dielectric layer of the capacitor sample, and an element mapping of Y element was performed in a visual field of 3.0 μm×3.0 μm using an auxiliary energy dispersion type X-ray spectrometer (STEM-EDX) for STEM to prepare an element mapping image of Y element. Five sheets of the element mapping image were prepared at respectively different observation points.

Then, the mapping images for Y element underwent image processing to be divided into a region whose concentration of Y element within the visual field was twice or larger than an average concentration thereof and a region whose concentration of Y element within the visual field was less than twice an average concentration thereof.

Next, mapping images of Ti element were prepared in the same manner as above at the same observation points as those where the element mapping of Y element had been performed. Then, the mapping images of Ti element underwent image processing to be divided into a region whose concentration of Ti element within the visual field was 0.7 to 1.1 times larger than an average concentration thereof and the other region.

Next, mapping images of Ba element were prepared in the same manner as above at the same observation points as those where the element mapping of Y element had been performed. Then, the mapping images of Ba element underwent image processing to be divided into a region whose concentration of Ba element within the visual field was 0.5 times or smaller than an average concentration thereof and a region whose concentration of Ba element within the visual field was larger than twice an average concentration thereof.

Next, the mapping images of Y element after the image processing, the mapping images of Ti element after the image processing, the mapping images of Ba element after the image processing were overlapped, and a Y—Ti segregation region was defined as a region where a concentration of Y element is twice or larger than an average concentration of Y element, a concentration of Ti was 0.7 to 1.1 times larger than an average concentration of Ti element, and a concentration of Ba element was 0.5 times or smaller than an average concentration of Ba element. Then, an area ratio of the Y—Ti segregation region with respect to the entire visual field was calculated and defined as a Y—Ti segregation ratio. Results are shown in Table 1.

High-Temperature Load Lifetime HALT-η

In the present example, the capacitor sample was held in an application state of a DC voltage under an electric field of 25 V/μm at 200° C., and a time from the beginning of application to the drop of insulation resistance by one order was defined as a high-temperature load lifetime HALT-η. In the present example, the above evaluation was conducted for 10 capacitor samples, and its average value was defined as a high-temperature load lifetime HALT-η. 10 hours or longer was considered to be good as evaluation standard. Results are shown in Table 1.

Relative Permittivity ∈s

Relative permittivity of the capacitor samples was measured using a LCR meter at a temperature of 20° C. and at a frequency of 1 kHz. Results are shown in Table 1. Incidentally, ∈s≥1900 was considered to be good in the present example.

Electrostatic Capacity Temperature Characteristics TC

Electrostatic capacity of the capacitor samples was measured using a thermostat and a LCR meter at temperatures of 25° C. and 125° C. Then, a change rate of electrostatic capacity at a temperature of 125° C. based on an electrostatic capacity at a temperature of 25° C. was calculated and defined as an electrostatic capacity temperature characteristic @125° C. Results are shown in Table 1. Incidentally, −15.0%≤TC@125° C.≤15.0% was considered to be good in the present example. It was confirmed that all capacitor samples satisfying −15.0% TC@125° C.≤15.0% satisfied X7R characteristics.

Evaluation

First, the problem of the present invention is not overcome by samples whose high-temperature load lifetime HALT-η was less than 10 hours. This case was considered as x regardless of results of relative permittivity and electrostatic capacity temperature characteristics. Next, when a high-temperature load lifetime was 10 hours or longer, ⊚ was defined as where both relative permittivity and electrostatic capacity temperature characteristics were good, ○ was defined as where either relative permittivity or electrostatic capacity temperature characteristics was good, and Δ was defined as where neither relative permittivity nor electrostatic capacity temperature characteristics was good (incidentally, Example 1 and Example 2 mentioned below had no samples evaluated as Δ). Incidentally, ⊚, ○, Δ, and x are more valued in this order.

TABLE 1

| Sample No. | BaTiO$_3$ mol part | BaO mol part | CaO mol part | SiO$_2$ mol part | Y$_2$O$_3$ mol part | MgO mol part | Cr$_2$O$_3$ mol part | V$_2$O$_5$ mol part | Y$_2$O$_3$/ SiO$_2$ | Grain diameter after firing d50 μm | Y—Ti segregation ratio % | HALT-η hr | εs | TC@ 125° C. % | Determination |
|---|---|---|---|---|---|---|---|---|---|---|---|---|---|---|---|
| 1a* | 100.00 | 1.20 | 0.80 | 2.00 | 0.00 | 2.00 | 0.20 | 0.10 | 0.00 | 0.42 | 0.00 | 0.1 | 2603 | −19.4 | X |
| 1 | 100.00 | 1.20 | 0.80 | 3.00 | 1.00 | 2.00 | 0.20 | 0.10 | 0.33 | 0.42 | 0.49 | 18.6 | 2120 | −15.0 | ⊚ |
| 2 | 100.00 | 1.20 | 0.80 | 2.50 | 1.50 | 2.00 | 0.20 | 0.10 | 0.60 | 0.42 | 0.79 | 14.5 | 1918 | −10.1 | ⊚ |
| 3 | 100.00 | 1.20 | 0.80 | 2.00 | 1.50 | 2.00 | 0.20 | 0.10 | 0.75 | 0.42 | 1.02 | 12.4 | 2011 | −9.4 | ⊚ |
| 4 | 100.00 | 1.20 | 0.80 | 1.65 | 1.30 | 2.00 | 0.20 | 0.10 | 0.79 | 0.42 | 1.29 | 10.0 | 2229 | −13.1 | ⊚ |
| 5* | 100.00 | 1.20 | 0.80 | 2.35 | 2.00 | 2.00 | 0.20 | 0.10 | 0.85 | 0.42 | 2.21 | 6.0 | 2314 | −6.2 | X |
| 6* | 100.00 | 1.20 | 0.20 | 2.00 | 1.50 | 2.00 | 0.20 | 0.10 | 0.75 | 0.42 | 1.70 | 8.2 | 2153 | −7.3 | X |
| 7 | 100.00 | 1.20 | 0.50 | 2.00 | 1.50 | 2.00 | 0.20 | 0.10 | 0.75 | 0.42 | 1.28 | 10.3 | 2109 | −8.2 | ⊚ |
| 8 | 100.00 | 1.20 | 0.75 | 2.00 | 1.50 | 2.00 | 0.20 | 0.10 | 0.75 | 0.42 | 1.05 | 12.2 | 2019 | −9.1 | ⊚ |
| 3 | 100.00 | 1.20 | 0.80 | 2.00 | 1.50 | 2.00 | 0.20 | 0.10 | 0.75 | 0.42 | 1.02 | 12.4 | 2011 | −9.4 | ⊚ |
| 9 | 100.00 | 1.20 | 1.00 | 2.00 | 1.50 | 2.00 | 0.20 | 0.10 | 0.75 | 0.42 | 0.84 | 14.0 | 2023 | −10.5 | ⊚ |
| 10 | 100.00 | 1.20 | 1.50 | 2.00 | 1.50 | 2.00 | 0.20 | 0.10 | 0.75 | 0.42 | 0.59 | 17.0 | 1946 | −11.7 | ⊚ |
| 11 | 100.00 | 1.20 | 2.00 | 2.00 | 1.50 | 2.00 | 0.20 | 0.10 | 0.75 | 0.42 | 0.52 | 18.1 | 2054 | −12.3 | ⊚ |
| 12* | 100.00 | 1.20 | 0.80 | 2.00 | 1.50 | 1.50 | 0.20 | 0.10 | 0.75 | 0.42 | 2.34 | 5.5 | 2151 | −10.0 | X |
| 13 | 100.00 | 1.20 | 0.80 | 2.00 | 1.50 | 1.80 | 0.20 | 0.10 | 0.75 | 0.42 | 1.30 | 10.0 | 2066 | −9.6 | ⊚ |
| 3 | 100.00 | 1.20 | 0.80 | 2.00 | 1.50 | 2.00 | 0.20 | 0.10 | 0.75 | 0.42 | 1.02 | 12.4 | 2011 | −9.4 | ⊚ |
| 14 | 100.00 | 1.20 | 0.80 | 2.00 | 1.50 | 2.20 | 0.20 | 0.10 | 0.75 | 0.42 | 0.83 | 14.1 | 2001 | −9.6 | ⊚ |

TABLE 1-continued

| Sample No. | BaTiO₃ mol part | BaO mol part | CaO mol part | SiO₂ mol part | Y₂O₃ mol part | MgO mol part | Cr₂O₃ mol part | V₂O₅ mol part | Y₂O₃/ SiO₂ | Grain diameter after firing d50 μm | Y—Ti segregation ratio % | HALT-η hr | εs | TC@ 125° C. % | Determination |
|---|---|---|---|---|---|---|---|---|---|---|---|---|---|---|---|
| 15 | 100.00 | 1.20 | 0.80 | 2.00 | 1.50 | 2.50 | 0.20 | 0.10 | 0.75 | 0.42 | 0.75 | 15.0 | 1881 | −9.7 | ○ |
| 16* | 100.00 | 1.20 | 0.80 | 2.00 | 1.50 | 2.00 | 0.10 | 0.10 | 0.75 | 0.42 | 1.91 | 7.2 | 2100 | −8.3 | X |
| 3 | 100.00 | 1.20 | 0.80 | 2.00 | 1.50 | 2.00 | 0.20 | 0.10 | 0.75 | 0.42 | 1.02 | 12.4 | 2011 | −9.4 | ⊚ |
| 17 | 100.00 | 1.20 | 0.80 | 2.00 | 1.50 | 2.00 | 0.30 | 0.10 | 0.75 | 0.42 | 0.82 | 14.3 | 2041 | −9.8 | ⊚ |
| 18 | 100.00 | 1.20 | 0.80 | 2.00 | 1.50 | 2.00 | 0.60 | 0.10 | 0.75 | 0.42 | 0.71 | 15.5 | 2001 | −11.4 | ⊚ |
| 19 | 100.00 | 1.20 | 0.80 | 2.00 | 1.50 | 2.00 | 0.70 | 0.10 | 0.75 | 0.42 | 0.68 | 15.8 | 1980 | −11.8 | ⊚ |
| 20* | 100.00 | 1.20 | 0.80 | 2.00 | 1.50 | 2.00 | 0.20 | 0.01 | 0.75 | 0.42 | 1.82 | 7.6 | 2314 | −17.9 | X |
| 21 | 100.00 | 1.20 | 0.80 | 2.00 | 1.50 | 2.00 | 0.20 | 0.05 | 0.75 | 0.42 | 1.17 | 11.3 | 2197 | −14.5 | ⊚ |
| 3 | 100.00 | 1.20 | 0.80 | 2.00 | 1.50 | 2.00 | 0.20 | 0.10 | 0.75 | 0.42 | 1.02 | 12.4 | 2011 | −9.4 | ⊚ |
| 22 | 100.00 | 1.20 | 0.80 | 2.00 | 1.50 | 2.00 | 0.20 | 0.15 | 0.75 | 0.42 | 0.85 | 14.0 | 2006 | −7.5 | ⊚ |
| 23 | 100.00 | 1.20 | 0.80 | 2.00 | 1.50 | 2.00 | 0.20 | 0.20 | 0.75 | 0.42 | 0.41 | 20.1 | 1876 | −6.1 | ○ |
| 24 | 100.00 | 0.20 | 0.80 | 2.00 | 1.50 | 2.00 | 0.20 | 0.10 | 0.75 | 0.42 | 0.46 | 19.0 | 1898 | −12.2 | ○ |
| 25 | 100.00 | 0.50 | 0.80 | 2.00 | 1.50 | 2.00 | 0.20 | 0.10 | 0.75 | 0.42 | 0.58 | 17.2 | 1946 | −11.6 | ⊚ |
| 26 | 100.00 | 1.00 | 0.80 | 2.00 | 1.50 | 2.00 | 0.20 | 0.10 | 0.75 | 0.42 | 0.84 | 14.1 | 2023 | −10.7 | ⊚ |
| 3 | 100.00 | 1.20 | 0.80 | 2.00 | 1.50 | 2.00 | 0.20 | 0.10 | 0.75 | 0.42 | 1.02 | 12.4 | 2011 | −9.4 | ⊚ |
| 27 | 100.00 | 1.50 | 0.80 | 2.00 | 1.50 | 2.00 | 0.20 | 0.10 | 0.75 | 0.42 | 1.28 | 10.4 | 2004 | −8.0 | ⊚ |

*Comparative Example

It was confirmed from Table 1 that high-temperature load lifetime was 10 hours or longer and good and reliability was improved when the area ratio occupied by the Y—Ti segregation region (Y—Ti segregation ratio) was 1.3% or less (excluding 0.0%).

Example 2

Multilayer ceramic capacitor samples of sample numbers 31 to 35 were fabricated in the same manner as sample number 3 of Example 1 except that d50 of material grain diameter was changed within a range of 0.25 μm to 0.50 μm. Then, the same characteristic evaluation was conducted as Example 1. Results are shown in Table 2.

TABLE 2

| Sample No. | Material grain diameter d50 μm | Grain diameter after firing d50 μm | Y—Ti segregation ratio % | HALT-η hr | εs | TC@125° C. % | Determination |
|---|---|---|---|---|---|---|---|
| 31 | 0.25 | 0.26 | 0.87 | 21.2 | 1559 | −6.9 | ○ |
| 32 | 0.30 | 0.32 | 0.98 | 19.1 | 1702 | −8.2 | ○ |
| 33 | 0.35 | 0.37 | 1.10 | 16.8 | 1769 | −8.8 | ○ |
| 3 | 0.40 | 0.42 | 1.23 | 12.4 | 2011 | −9.4 | ⊚ |
| 34 | 0.45 | 0.47 | 1.30 | 10.2 | 2110 | −10.4 | ⊚ |
| 35* | 0.50 | 0.53 | 1.42 | 6.0 | 2223 | −11.0 | X |

*Comparative Example

Table 2 shows that the larger dielectric particle grain diameter d50 is, the larger the Y—Ti segregation ratio is. Then, multilayer ceramic capacitors with higher reliability were obtained when the Y—Ti segregation ratio was within a range of 1.3% or less compared with when the Y—Ti segregation ratio was more than 1.3%.

NUMERICAL REFERENCES

1 . . . multilayer ceramic capacitor
2 . . . dielectric layer
3 . . . internal electrode layer
4 . . . external electrode
10 . . . capacitor element body

The invention claimed is:

1. A ceramic electronic component comprising a dielectric layer and an electrode layer, wherein
the dielectric layer contains barium titanate and yttrium,
the dielectric layer contains dielectric particles and Y—Ti segregation particles,
an area ratio occupied by the Y—Ti segregation particles is 1.3% or less on a cross section of the dielectric layer,
the dielectric layer contains magnesium, chromium, vanadium, calcium, and silicon and
an amount of yttrium is 1.0 to 1.5 mol parts in terms of $Y_2O_3$, an amount of magnesium is 1.8 to 2.5 mol parts in terms of MgO, an amount of chromium is 0.2 to 0.7 mol parts in terms of $Cr_2O_3$, an amount of vanadium is 0.05 to 0.2 mol parts in terms of $V_2O_5$, an amount of calcium is 0.5 to 2.0 mol parts in terms of CaO, and an amount of silicon is 1.65 to 3.0 mol parts in terms of $SiO_2$, provided that an amount of barium titanate is 100 mol parts in terms of $BaTiO_3$.

2. The ceramic electronic component according to claim 1, wherein
d50 of the dielectric particles is 0.47 μm or less.

3. The ceramic electronic component according to claim 1, wherein
a value of an amount of yttrium in terms of $Y_2O_3$ in the dielectric layer divided by an amount of silicon in terms of $SiO_2$ in the dielectric layer is 0.79 or less.

4. The ceramic electronic component according to claim 2, wherein
a value of an amount of yttrium in terms of $Y_2O_3$ in the dielectric layer divided by an amount of silicon in terms of $SiO_2$ in the dielectric layer is 0.79 or less.

* * * * *